(12) United States Patent
Thornburg

(10) Patent No.: US 10,266,168 B2
(45) Date of Patent: Apr. 23, 2019

(54) SYSTEM AND METHOD FOR PREDICTIVE ROAD SENSING TO MINIMIZE TRANSIENT ELECTRICAL LOAD ISSUES

(71) Applicant: Ford Global Technologies, LLC, Dearborn, MI (US)

(72) Inventor: Doug B. Thornburg, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/820,339

(22) Filed: Aug. 6, 2015

(65) Prior Publication Data
US 2017/0036676 A1 Feb. 9, 2017

(51) Int. Cl.
| | | |
|---|---|---|
| *B60L 3/00* | (2006.01) | |
| *B60L 15/20* | (2006.01) | |
| *B60W 10/18* | (2012.01) | |
| *B60W 10/20* | (2006.01) | |
| *B60W 10/22* | (2006.01) | |

(Continued)

(52) U.S. Cl.
CPC ........... *B60W 10/22* (2013.01); *B60L 3/0015* (2013.01); *B60L 15/20* (2013.01); *B60L 15/2009* (2013.01); *B60W 10/18* (2013.01); *B60W 10/20* (2013.01); *B60W 10/30* (2013.01); *B60W 30/18009* (2013.01); *B60W 50/0097* (2013.01); *B60L 2240/64* (2013.01); *B60L 2240/647* (2013.01); *B60W 2550/14* (2013.01); *Y02T 10/645* (2013.01); *Y02T 10/646* (2013.01); *Y02T 10/72* (2013.01); *Y02T 10/7275* (2013.01); *Y02T 10/7291* (2013.01); *Y02T 90/16* (2013.01)

(58) Field of Classification Search
None
See application file for complete search history.

(56) References Cited

U.S. PATENT DOCUMENTS

| | | | | |
|---|---|---|---|---|
| 7,342,370 B2 * | 3/2008 | Greene | ................ | B60N 2/0232 |
| | | | | 318/139 |
| 7,597,164 B2 * | 10/2009 | Severinsky | ............ | B60H 1/004 |
| | | | | 180/65.27 |

(Continued)

FOREIGN PATENT DOCUMENTS

| | | | |
|---|---|---|---|
| CA | 2098430 A | * | 12/1993 |
| CN | 102291061 A | | 12/2011 |

(Continued)

OTHER PUBLICATIONS

Search Report dated Feb. 10, 2017 for Great Britain Patent Application No. GB 1613239.1.

*Primary Examiner* — Jean Paul Cass
(74) *Attorney, Agent, or Firm* — Frank Lollo; Neal, Gerber & Eisenberg LLP; James P. Muraff

(57) ABSTRACT

Various embodiments of the present disclosure provide systems and methods for predictive road sensing to minimize transient electrical load issues in a vehicle. More specifically, various embodiments include a system and method for minimizing electrical load issues in a vehicle by sensing a vehicle's surroundings using sensing devices (such as sensors, or a camera), utilizing detected road condition information to determine a need for starting and/or operating a motor, and preemptively soft starting the motors to avoid a spike in transient load for the vehicular control system.

19 Claims, 3 Drawing Sheets

(51) Int. Cl.
*B60W 10/30* (2006.01)
*B60W 30/18* (2012.01)
*B60W 50/00* (2006.01)

(56) References Cited

U.S. PATENT DOCUMENTS

| | | | | |
|---|---|---|---|---|
| 7,675,655 | B2* | 3/2010 | Marshall | G06T 3/4038 340/435 |
| 8,060,288 | B2* | 11/2011 | Choby | B60T 7/20 701/70 |
| 8,160,766 | B2* | 4/2012 | Donnelli | G07C 5/008 701/33.7 |
| 8,258,934 | B2* | 9/2012 | Filev | B60W 30/02 180/170 |
| 8,311,720 | B2* | 11/2012 | Pelosse | B60W 30/16 123/349 |
| 8,447,437 | B2* | 5/2013 | Chiang | G08G 1/165 340/435 |
| 8,471,726 | B2* | 6/2013 | Ekmark | G08G 1/166 340/435 |
| 8,585,551 | B2* | 11/2013 | Choby | F16H 61/66 477/120 |
| 8,655,569 | B2* | 2/2014 | Choby | G06F 19/00 180/197 |
| 8,738,228 | B2* | 5/2014 | Filev | B60W 50/08 701/36 |
| 8,989,949 | B2* | 3/2015 | Lohberg | B60G 17/0195 701/30.3 |
| 9,008,896 | B2* | 4/2015 | Wanami | B60R 21/0136 701/32.2 |
| 9,008,940 | B2* | 4/2015 | Ueyama | B60W 30/095 340/435 |
| 2004/0019426 | A1* | 1/2004 | Knoop | B60T 7/22 701/301 |
| 2004/0232864 | A1* | 11/2004 | Sunaga | H02P 7/29 318/434 |
| 2007/0030954 | A1* | 2/2007 | Dugan | G01N 1/02 378/57 |
| 2007/0069734 | A1* | 3/2007 | Bertness | G01R 31/007 324/411 |
| 2007/0170778 | A1* | 7/2007 | Yamaguchi | B60K 1/00 307/10.1 |
| 2007/0194761 | A1* | 8/2007 | Yamaguchi | H02J 7/1446 322/28 |
| 2008/0147277 | A1* | 6/2008 | Lu | B60W 30/085 701/45 |
| 2009/0248284 | A1* | 10/2009 | Yoshioka | G01C 21/26 701/117 |
| 2010/0070120 | A1* | 3/2010 | Bailey | B60K 6/46 701/22 |
| 2010/0147258 | A1* | 6/2010 | Edwards | F02D 17/02 123/198 F |
| 2010/0191391 | A1* | 7/2010 | Zeng | G01S 13/723 701/1 |
| 2012/0212804 | A1* | 8/2012 | Sarkisyan | H01S 3/2325 359/342 |
| 2012/0213236 | A1* | 8/2012 | Lundquist | H01S 3/0604 372/25 |
| 2012/0296505 | A1 | 11/2012 | Igarashi et al. | |
| 2012/0326676 | A1* | 12/2012 | Ahnfalk | B60R 16/03 322/17 |
| 2013/0289830 | A1* | 10/2013 | Kamiya | B60L 7/18 701/48 |
| 2015/0197243 | A1* | 7/2015 | Johri | B60W 10/06 701/22 |
| 2016/0274589 | A1* | 9/2016 | Templeton | G05D 1/0246 |

FOREIGN PATENT DOCUMENTS

| | | | |
|---|---|---|---|
| DE | 102014219544 A1 | 3/2016 | |
| EP | 0398307 A1 * | 11/1990 | B60K 28/14 |
| JP | H0965512 A | 3/1997 | |
| JP | 2014113974 A | 6/2014 | |
| WO | WO 2013/167149 A1 | 11/2013 | |

* cited by examiner

SYSTEM AND METHOD FOR PREDICTIVE ROAD SENSING TO MINIMIZE TRANSIENT ELECTRICAL LOAD ISSUES

TECHNICAL FIELD

The present disclosure generally relates to a system and method for predictive road sensing to minimize transient electrical load issues in a vehicle. More particularly, the vehicle control system is configured to soft start the vehicular electric motor based on predictive technologies.

BACKGROUND

Modern vehicles have an increasing number of electromechanical motor actuators that are used to control chassis and driveline functions. When the electromechanical motors activate, they can draw hundreds of amps of current in a very short time as they perform their functions. As vehicular control systems power more and more actuators in vehicles for various systems such as brakes, steering, suspension, and all wheel drive, their combined peak loads can reach a point where their combined current draw starts to bring down the vehicle system voltage provided by the alternator and battery. If unchecked, this dropping of the system voltage can cause loss, degraded or intermittent function of not only the functions controlled by the actuators but any function dependent on a stable system voltage (radio, cluster, etc.).

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detailed description, and such implementations are intended to be within the scope of this application.

Exemplary embodiments provide systems and methods for predictive road sensing to minimize transient electrical load issues in a vehicle. More specifically, transient electrical load issues refer to issues that arise when a vehicular control system is powering multiple actuators for various vehicle systems such as brakes, steering, and suspension systems and the combined peak loads of the various systems reach a point where their combined current draw starts to bring down the vehicle control system voltage provided by the alternator and battery. If unchecked, this dropping of the system voltage can cause loss, degraded or intermittent function of not only the functions controlled by the actuators but any function dependent on a stable system voltage (radio, cluster, etc.). A common cause of transient load issues is when a vehicle encounters a changed road condition (such as a bump in the road) and the driver suddenly activates a vehicle system (such as the brake system) and this abrupt activation of the vehicle system causes a spike in current draw.

Various embodiment of the present disclosure include a system and method for minimizing electrical load issues in a vehicle by sensing a vehicle's surroundings using road condition sensing devices (such as sensors, or a camera), and utilizing detected road condition information to preemptively start and/or operate a motor prior to the vehicle encountering the changed road condition. For example, in one embodiment, a processor within the vehicle's control system is configured to sense an upcoming turn in the vehicle's path, and send a message to the brake system to soft start the motors in the brake system to begin building pressure in the brake lines. In the event that the passenger in the vehicle brakes, the peak power required to power the breaks is spread out over time.

According to some embodiments, a vehicle control system includes a road condition detector such as one or more sensors and/or cameras configured to obtain road condition information and a processor configured to analyze the road condition information and if a triggering condition is satisfied based on the road condition information, implement soft start of the corresponding motor.

Through such a configuration, the vehicle control system of the present disclosure preemptively soft starts the motors of one or more vehicle systems prior to encountering a changed road condition, and thereby spreads the current draw over a period of time to avoid a spike in transient load for the vehicular control system.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
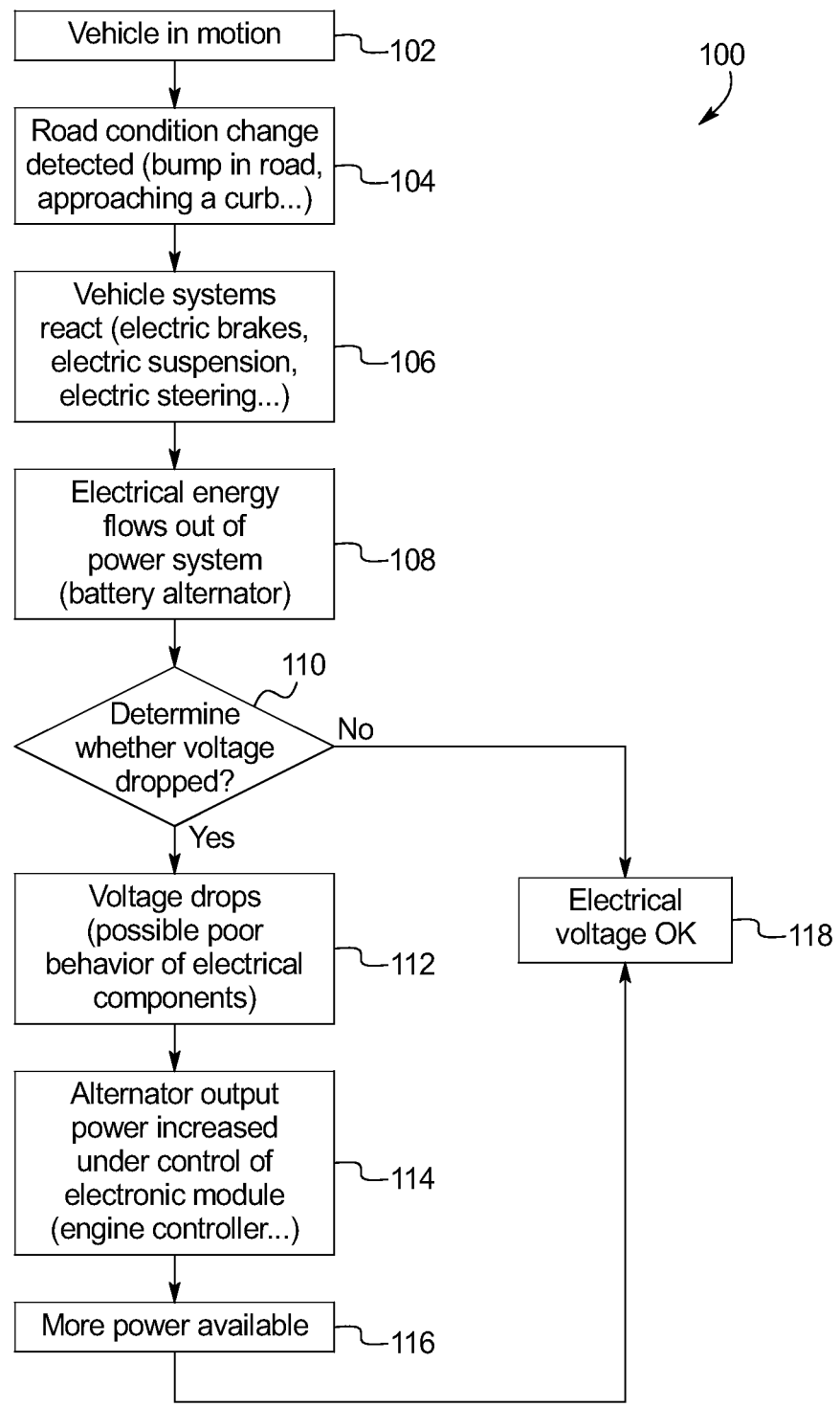
FIG. 1 is a flowchart illustrating a process for operating a vehicle control system that does not include the predictive road sensing of the present disclosure.

While the vehicle control system and method of the present disclosure may be embodied in various forms, there are shown in the drawings, and will hereinafter be described, some exemplary and non-limiting embodiments of the vehicle control system and method. The present disclosure is to be considered an exemplification of the vehicle control system and method and is not intended to limit the vehicle control system and method to the specific embodiments illustrated and described herein. Not all of the depicted components described in this disclosure may be required, however, and some embodiments may include additional, different, or fewer components from those expressly described herein. Variations in the arrangement and type of the components may be made without departing from the spirit or scope of the claims set forth herein.

Various embodiments of the present disclosure provide a system and method for controlling one or more vehicle components based on predictive road sensing capabilities. More specifically, the vehicle control system of the present disclosure includes a detection system comprising one or more road condition detectors (such as one or more sensors and/or one or more cameras) configured to obtain road condition information of an external vicinity of a vehicle and a processor configured to analyze the road condition information to determine whether there is an upcoming change in the road conditions that requires one or more vehicle systems to react. The detection system communicates with an electrical power manager configured to determine whether the activation of one or more vehicle systems will cause a voltage drop in the vehicle control system. The electrical power manager is further configured to soft start one or more motors of the implicated vehicle system prior to causing one of the systems to react to minimize transient electrical load issues.

The components of the vehicle control system of the present disclosure (described in detail below) may be included on, within, or otherwise integrated with a vehicle. One or more of the components of the vehicle control system may be shared with one or more components of existing vehicle systems.

The vehicle control system may be included in or otherwise usable with any suitable vehicle, such as (but not limited to): (1) a non-commercial passenger vehicle such as a sedan or a truck; (2) a commercial vehicle such as a tractor-trailer; or (3) a non-civilian vehicle such as a vehicle used by a law enforcement agency, a government agency, an emergency response agency (e.g., a fire response agency), or a medical response agency (e.g., a hospital). This list is not exhaustive, and is provided for exemplary purposes only.

The features, processes, and methods described herein with respect to the capabilities of the vehicle control system may be implemented by a vehicle control tool running on the vehicle control system. The vehicle control tool may be a program, application, and/or combination of software and hardware that is incorporated on one or more of the components that comprise the vehicle control system. The vehicle control tool and the vehicle control system are described in more detail below (and collectively referred to as the vehicle control system for brevity).

Although the vehicle and the features corresponding to the vehicle control system described herein are described below in situations in which the vehicle is moving, it is also within the scope of this disclosure that the same features may apply when the vehicle is in a stationary state (e.g., parked, stopped at a red light, or stopped in traffic).

Figure 2:
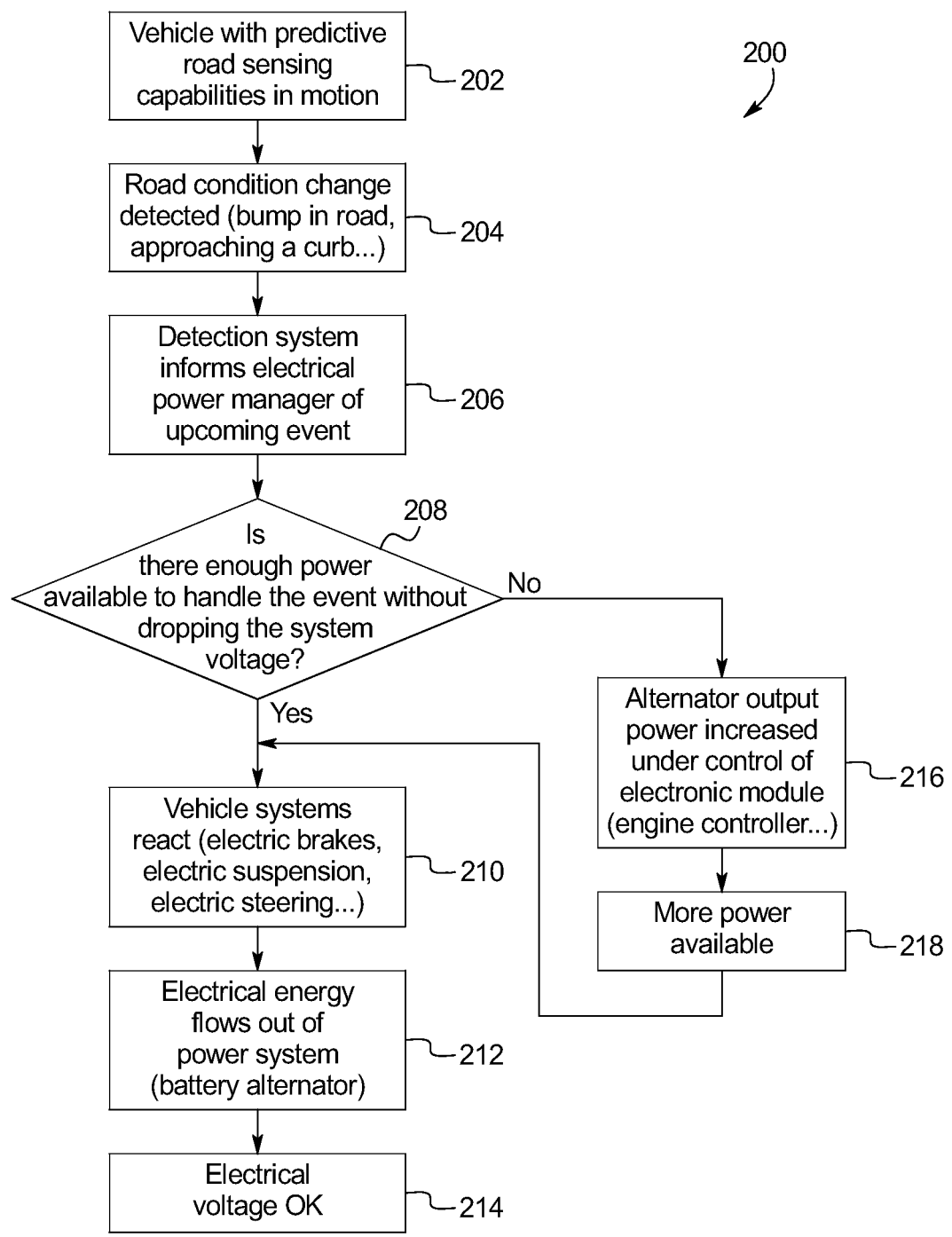
FIG. 2 is a flowchart illustrating a process for operating one example embodiment of the vehicle control system with predictive road sensing of the present disclosure.

FIGS. 1 and 2 are flowcharts of example processes or methods of operating a vehicle control system in response to a changed road condition. FIG. 1 depicts an example process 100 of operating a vehicle control system that does not include predictive road sensing capabilities of the present disclosure. FIG. 2 depicts an example of process 200 of operating a vehicle control system with predictive road sensing capability of the present disclosure.

In various embodiments, the processes are represented by a set of instructions stored in one or more memories and executed by one or more processors (such as those described below in connection with FIG. 3). Although the processes are described with reference to the flowcharts shown in FIG. 2, many other processes of performing the acts associated with these illustrated processes may be employed. For example, the order of certain of the illustrated blocks and/or diamonds may be changed, certain of the illustrated blocks and/or diamonds may be optional, and/or certain of the illustrated blocks and/or diamonds may not be employed.

Turning to FIG. 1, in this example, a vehicle is in motion, as indicated by block 102. When the vehicle is in motion, several vehicle systems are used to control chassis and driveline functions. Each vehicle system includes one or more electro mechanical motor actuators. Under unchanged road conditions, when these systems are operating at a constant state the electrical power demand is fairly constant and the vehicle power system can manage the operation of multiple systems simultaneously.

While the vehicle is in motion, the vehicle control system detects a change in the road condition, as indicated by block 104. The change in the road condition may be any physical change in the road (i.e., a bump in the road or a curb approaching) that causes a driver of the vehicle to engage a vehicle system such as, for example the brake system, steering system, or suspension system. The change in the road condition may also be any change in a vehicle's path, such as, for example, a collision up ahead, or an animal crossing. The vehicle controller of FIG. 1 does not include road condition detection. Thus, in this example embodiment, the vehicle control system reacts to the change in the road condition at the time the vehicle is encountering the changed condition.

In other words, in this example, when the change in road condition occurs, the vehicle control system causes one or more of the vehicle systems to react to the change in the road condition, as indicated by block 106. For example, if the moving vehicle encounters a bump in the road and the driver engages the brakes, the vehicle control system causes the activation of the brake system in response to the detected bump in the road.

When any vehicular system is activated, the motor actuators of that vehicular system draw current as the motor actuators ramp up to the necessary speed to react to the changed road condition. A sudden activation of the vehicular system causes the vehicular systems to draw hundreds of amps of current in a very short period of time. If multiple systems suddenly activate at the same time, all drawing hundreds of amps of current at the same time, their combined peak loads can reach a point where their combined draw starts to bring down the vehicle system.

That is, when the vehicle control system causes one or more vehicle systems to react, the vehicle control system causes electrical energy to flow from the power system (battery alternator), as indicated by block 108. In many instances, this significant energy flow may cause a drop in the electrical system voltage, as indicated by diamond 110. If the voltage does not drop, the electrical voltage of the vehicle power system is acceptable to accommodate the changed road condition, as indicated by block 118. On the other hand, if the voltage does drop, the electrical components of the corresponding system may not function appropriately, as indicated by block 112. In this example, if the voltage drops, the vehicle control system increases alternator output power under control of an electronic module in the engine controller, as indicated by block 114. After a period of time, more power becomes available, as indicated by block 116, and the electrical voltage returns to the acceptable level for the vehicle system.

It should be appreciated that when the sudden change in the electrical system of the vehicle causes the voltage to drop, it could take several hundred milliseconds to pull more power and for the voltage level to become adequate for the system. This dropping of the system voltage can cause loss, degraded or intermittent function of all functions controlled by the actuators as well as any function dependent on a stable system voltage (such as the radio, or cluster). As such, the depth of the voltage drop and the time of the voltage drop prevent the power system of the vehicle to function correctly.

On the other hand, as illustrated in FIG. 2, the vehicle control system with predictive road sensing technology of the present disclosure reduces this voltage drop and the period of time (if any) that the voltage remains lower than the acceptable level for the vehicle's power system. It should be appreciated that even if a voltage drop is not eliminated completely, any minimization in the depth or duration of a voltage drop improves the operation and function of the vehicle system.

In various embodiments, unlike the vehicle control system of FIG. 1, the vehicle control system with predictive road sensing capability of FIG. 2 includes: (1) predictive road condition sensing capabilities and (2) transient electrical load management capabilities. More specifically, the vehicle control system with predictive road sensing capabilities utilizes sensors and/or cameras to predict changes in the road condition prior to the vehicle encountering the changes so that the vehicle control system can appropriately address the approaching road condition changes. By knowing the upcoming changed road condition in advance, the vehicle control system causes the actuators of the relevant vehicle system to start prior to actually needing the vehicle system. By starting the motor actuators earlier, the vehicle control system enables the motor actuators to ramp up to the necessary speed over a period of time rather than abruptly.

Turning to FIG. 2, the vehicle with the predictive road sensing capability is in motion, as indicated by block 202. In this example, unlike the example described above with respect to FIG. 1, the vehicle control system includes a detection system that uses predictive road sensing to detect a change in the road condition, as indicated by block 204. More specifically, the as described in greater detail below, the detection system of the vehicle control system obtains road condition information using one or more road condition detectors such as one or more sensors and/or cameras of existing systems within the vehicle. A processor of the vehicle control system analyzes the obtained road condition information to determine whether there is an upcoming change in the road condition. Using the example described above, in this example embodiment, a camera of the detection system may capture images of a bump in the road that the vehicle is approaching.

As illustrated in FIG. 2, the vehicle control system includes a detection system that informs the electrical power manager of the upcoming changed road condition, as indicated by block 206. More specifically, once the detection system determines that the vehicle is approaching a changed road condition, the detection system communicates the changed road condition information to an electrical power manager of the vehicle control system. The detection system communicates the road condition information using existing vehicle communication systems such as, but not limited to, a Controller Area Network (CAN) bus, Ethernet, Flex Ray systems. The vehicle control system determines which vehicle system is required to react to accommodate the changed road condition. Continuing with the example described above, the vehicle control system determines that for an upcoming bump in the road, the vehicle brake system and/or the vehicle steering system may be activated. The electrical power manager determines whether there is enough power available to activate the determined vehicle systems to handle the change in the road condition without dropping the voltage system, as indicated by diamond 208.

If the vehicle control system determines there is sufficient power available to handle the upcoming changed road condition, the vehicle control system causes the corresponding vehicular system to react, as indicated by block 210. That is, if the electrical power manager determines that causing one or more vehicle systems to activate in response to the changed road condition will not cause a significant drop in voltage, the vehicle control system will cause the one or more vehicle systems to react accordingly.

If, on the other hand, there is not enough power available to handle the upcoming changed road condition, the vehicle control system causes the alternator output power to increase under the control of the electronic module, as indicated by block 216. More specifically, the vehicle control system causes the motors of the implicated vehicle systems to soft start. Soft starting is accomplished by ramping up the voltage controlling the motor over a period of time rather than turning them up abruptly. When a motor is soft started, it does not generate the huge peak transient loads that occur when it is switched on abruptly. Accordingly, by soft starting the motors, more power is available, as indicated by block 218.

In this example embodiment, after determining that sufficient power is available, the vehicle control system causes the corresponding vehicular system (i.e., the electric brake system) to react to the changed road condition, as indicated by block 210. As the one or more vehicle systems react to the changed road condition, the electrical energy flows out of the power system (battery alternator), as indicated by block 212, and the electrical voltage is at an acceptable level, as indicated by block 214. Because the motor actuators of the vehicle systems were already started, the current drawn as they ramped up to react to the changed road condition did not cause as significant of a peak transient load.

Comparing FIG. 1 to FIG. 2, the vehicle control system with predictive road sensing capability of FIG. 2 preemptively compensates for the extra draw of current required for the vehicle system reaction. That is, in FIG. 1, the vehicle system reaction (as indicated by block 106) occurs without any kind of warning to the vehicle system. Thus, after the vehicle system is activated, if the voltage drops, the control system retroactively increases the alternator output power as indicated by block 114. The period of time that the voltage drop lasts, and the degree of the voltage drop may degrade the performance of the electrical features. On the other hand, as illustrated by FIG. 2, the vehicle control system with predictive road sensing, preemptively increases power prior to the vehicle system reacting to a changed road condition. Through such a configuration, even if a voltage drop is not prevented completely, every reduction in the duration or degree of the voltage drop improves the electrical system of the vehicle.

Accordingly, for the example embodiment described above, if the driver of a vehicle brakes suddenly to avoid the bump in the road, the system can draw a lot of energy from the electrical system. Thus, the vehicle control system of the present disclosure utilizes a camera in communication with the controller that captures images indicating that the vehicle is about to go over a bump in the road, and before the vehicle encounters the bump in the road, the vehicle control system sends a message, or signal, to the vehicle brake system signaling that the vehicle is about to engage the brakes. A processor of the vehicle control system is configured to start the actuator for the electric brake system earlier than when it is actually engaged to reduce the amount of time to get the motors up to speed. Soft starting the motors builds pressure in the brake lines and gets the pumps spinning. As such, if the driver of the vehicle happens to engage the brakes, the brake system is already activated and the peak power has been spread out over time.

Such a configuration enables the processor within the vehicle control system to start the actuator of each implicated vehicle system prior to actually utilizing the system for any change in a road condition. Starting the actuator earlier in this manner reduces the amount of time it would take to get the motors of the implicated system up to speed when the system is activated. Such a configuration is especially beneficial as systems in vehicles are now electrified and therefore they are active and require power. As there are an increasing number of these systems, there is becoming a big issue for the power generation capability in vehicles. The systems can draw so much power that they cause the voltage to drop and cause a brown outs.

It should be appreciated that depending on the changed road condition, in certain circumstances the changed road condition may occur fast enough that there is some overlap between the energy draw starting and the additional energy being available. However, the predictive road sensing capabilities of the present disclosure are still beneficial as the length in time of any voltage drop and the possible depth of the voltage drop are reduced as compared to the system in FIG. 1.

Road Condition Detection

In various embodiments, the vehicle is equipped with cameras and sensors for implementing systems incorporating curve follow technology, collision prevention technology, navigation systems and other such systems. For instance, in certain embodiments, the vehicle may include, and the vehicle control system may be configured to communicate with, one or more sensors such as a radar sensor, an infrared sensor, and/or an ultrasonic sensor. The vehicle control system receives information or data from one or more of these sensors.

In other embodiments, the vehicle control system obtains image information, such as digital still images, streaming video, and/or digital video, via one or more suitable cameras (or other imaging devices) on, integrated into, or otherwise associated with the vehicle. At least one of the cameras is oriented so as to obtain image information in the vicinity of the vehicle. This enables the camera to obtain image data of road signs and other objects that are generally viewable from the perspective of the driver of the vehicle.

The vehicle control system can then use this information to determine whether any upcoming changes in the road condition will require a reaction from one or more vehicle systems. In certain embodiments (and as described in detail below), the one or more sensors and the one or more cameras are in communication with and configured to transmit the obtained image information to the processor of the vehicle control system to enable the processor to analyze the image information. In other embodiments, the one or more cameras are in communication with and configured to transmit the obtained image information to a memory device, which subsequently stores the image information. The processor may review the image information by accessing the memory device.

Vehicle Control System Components

Figure 3:
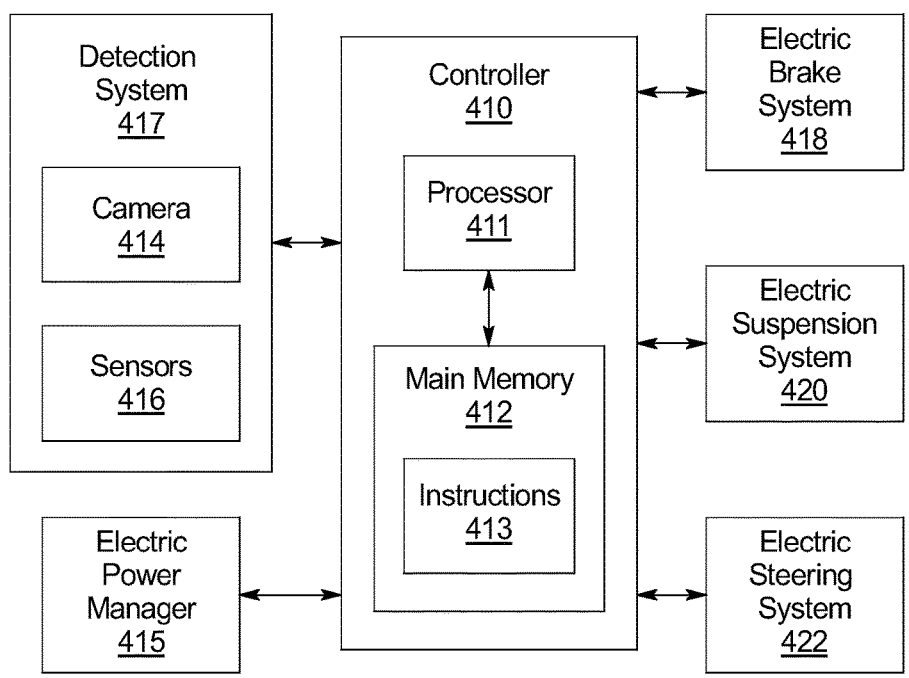
FIG. 3 illustrates a block diagram including components of one embodiment of the vehicle control system with predictive road sensing of the present disclosure.

FIG. 3 illustrates one example embodiment of the vehicle control system 400. Other embodiments of the vehicle control system may include different, fewer, or additional components than those described below and shown in FIG. 3.

The vehicle control system 400 includes a controller 410 comprised of at least one processor 411 in communication with a main memory 412 that stores a set of instructions 413. The processor 411 is configured to communicate with the main memory 412, access the set of instructions 413, and execute the set of instructions 413 to cause the vehicle control system 400 to perform any of the methods, processes, and features described herein. The vehicle control system 400 also includes a one or more cameras 414 and one or more sensors 416 in communication with the controller 410. As described above, the one or more cameras 414 and the one or more sensors 416 are components of other existing vehicular systems (not shown) with sensing technologies.

In one embodiment, the sensing components such as one or more cameras 414 and the one or more sensors 416 from existing systems within the vehicle are conceptually part of a detection system 417. This detection system 417 includes any vehicular component with sensing technologies. That is, the cameras 414 and sensors 416 are included as non-limiting examples. The predictive road sensing capabilities of the present disclosure may be performed by any other vehicular component with sensing capabilities, such as, but not limited to radars, navigation systems, and electronic horizon systems.

In addition to the detection system, the vehicle control system includes an electrical power manager 415 configured to communicate voltage information to and from the controller 410 and to and from the motors of each of the vehicle systems of the vehicle. The electrical power manager 415 determines whether and when to soft start the motors for a vehicle system in response to an upcoming changed road condition.

The processor 411 may be any suitable processing device or set of processing devices such as, but not limited to: a microprocessor, a microcontroller-based platform, a suitable integrated circuit, or one or more application-specific integrated circuits (ASICs) configured to execute the set of instructions 413. The main memory 412 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and/or read-only memory.

In some embodiments, the set of instructions 413 stored on the main memory 412 and that are executable to enable the functionality of the vehicle control system may be downloaded from an off-site server via an external network. Further, in some embodiments, the vehicle control system 400 may communicate with a central command server via the external network. For example, the vehicle control system 400 may communicate image information obtained by the camera of vehicle control system 400 to the central command server. The vehicle control system 400 may also communicate any generated data to the central command server.

The vehicle control system 400 is configured to communicate with a plurality of vehicle components and vehicle systems (such as via one or more communications buses (not shown)) including, but not limited to: an electric brake system 418, and electric suspension system 420, and an electric steering system 422.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle comprising:
   a detector to obtain road condition information; and
   a processor to:
      identify a changing road condition utilizing the road condition information;
      predict, in response to identifying the changing road condition, whether a voltage drop is to occur based on activation of a vehicle system for encountering the changing road condition;
      cause, responsive to predicting the voltage drop, an alternator to increase an output power prior to encountering the changing road condition to deter the voltage drop from occurring; and
      prior to the vehicle encountering the changing road condition:
         approximate a first amount of voltage drawn from the alternator to the vehicle system for encountering the changing road condition; and
         determine whether the alternator includes the first amount and a second amount of voltage for providing a stable system voltage to the vehicle.

2. The vehicle of claim 1, wherein the detector includes at least one of a camera, a sensor, and a radar and the vehicle system includes at least one of a vehicle brake system, a vehicle steering system, a vehicle suspension system, and a vehicle all wheel drive system.

3. The vehicle of claim 1, wherein the vehicle system is to activate in response to the vehicle encountering the changing road condition, the changing road condition consisting of one or more of a bump in a road, a curb along the road, a collision on the road, and an animal crossing the road.

4. The vehicle of claim 1, wherein the processor is configured to communicate the changing road condition to an electrical power manager.

5. The vehicle of claim 4, wherein the vehicle system comprises one or more actuators that are controlled by voltage output from the alternator.

6. The vehicle of claim 5, wherein the processor communicates with the electrical power manager to cause the alternator to increase the output power of the vehicle system.

7. The vehicle of claim 6, wherein the electrical power manager causes the alternator to increase the output power to reduce a transient electrical load of the vehicle to deter the voltage drop from occurring by causing the alternator to ramp up the voltage that controls the one or more actuators of the vehicle system over a period of time.

8. A vehicle control method comprising:
   obtaining, by a road condition detector, road condition information for a vehicle;
   identifying, by a processor, a changing road condition that is upcoming based on the road condition information;
   determining, in response to identifying the changing road condition, whether a voltage drop is to occur as a result of activating a vehicle system for encountering the changing road condition;
   activating the vehicle system prior to the vehicle encountering the changing road condition;
   causing, in response to determining that the voltage drop is to occur, an alternator to increase an output power of the vehicle system prior to the vehicle encountering the changing road condition to deter the voltage drop from occurring; and
   prior to the vehicle encountering the changing road condition:
      approximating a first amount of voltage drawn from the alternator to the vehicle system for encountering the changing road condition; and
      determining whether the alternator includes the first amount and a second amount of voltage for providing a stable system voltage to the vehicle.

9. The method of claim 8, wherein the road condition detector includes at least one of a camera, a sensor, and a radar.

10. The method of claim 8, wherein the vehicle system includes at least one of a vehicle brake system, a vehicle steering system, a vehicle suspension system, and a vehicle all wheel drive system.

11. The method of claim 8, further comprising communicating, by the processor, the changing road condition to an electrical power manager.

12. The method of claim 11, wherein the vehicle system comprises one or more actuators that are controlled by voltage output from the alternator.

13. The method of claim 12, further comprising causing the processor to communicate with an electrical power manager to cause the alternator to increase the output power of the vehicle control method.

14. The method of claim 13, further comprising causing, via the electrical power manager, the alternator to increase output power to reduce the transient electrical load of the vehicle by causing the alternator to ramp up the voltage that controls the one or more actuators of the vehicle system over a period of time.

15. The vehicle of claim 1, wherein the processor causes the alternator to increase the output power of the vehicle system prior to the vehicle encountering the changing road condition to spread a current drawn by the vehicle system over a period of time to reduce a spike in the transient electrical load as the vehicle encounters the changing road condition.

16. The method of claim 8, further including identifying which of a plurality of vehicle systems to activate based upon the changing road condition encountered by the vehicle.

17. The vehicle of claim 1, wherein the processor is to, prior to the vehicle encountering the changing road condition, determine the vehicle system for encountering the changing road condition among a plurality of vehicle systems.

18. The vehicle of claim 1, wherein the processor is to, prior to the vehicle encountering the changing road condition, cause the alternator to increase the output power in response to the alternator having a voltage amount less than a sum of the first amount and the second amount.

19. The vehicle of claim 18, wherein the processor is to, prior to the vehicle encountering the changing road condition, cause the alternator to increase the output power to a level equivalent to the sum in response to the alternator having the voltage amount less than the sum.

\* \* \* \* \*